United States Patent
Feng et al.

(10) Patent No.: US 10,659,768 B2
(45) Date of Patent: May 19, 2020

(54) SYSTEM AND METHOD FOR VIRTUALLY-AUGMENTED VISUAL SIMULTANEOUS LOCALIZATION AND MAPPING

(71) Applicants: Mitsubishi Electric Research Laboratories, Inc., Cambridge, MA (US); Mitsubishi Electric Corporation, Chiyoda-ku, Tokyo (JP)

(72) Inventors: Chen Feng, Cambridge, MA (US); Yuichi Taguchi, Arlington, MA (US); Esra Cansizoglu, Malden, MA (US); Srikumar Ramalingam, Salt Lake City, UT (US); Khalid Yousif, Santa Clara, MA (US); Haruyuki Iwama, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 15/444,601

(22) Filed: Feb. 28, 2017

(65) Prior Publication Data
US 2018/0249144 A1   Aug. 30, 2018

(51) Int. Cl.
*H04N 13/279* (2018.01)
*H04N 13/204* (2018.01)
(Continued)

(52) U.S. Cl.
CPC .......... *H04N 13/279* (2018.05); *G06T 7/246* (2017.01); *G06T 7/579* (2017.01); *H04N 13/204* (2018.05)

(58) Field of Classification Search
None
See application file for complete search history.

(56) References Cited

U.S. PATENT DOCUMENTS

| 7,162,338 B2 | 1/2007 | Goncalves et al. |
| 2014/0126769 A1* | 5/2014 | Reitmayr .................. G06T 7/73 382/103 |

(Continued)

FOREIGN PATENT DOCUMENTS

WO   2014003081 A1   1/2014

OTHER PUBLICATIONS

Cadena et al., "Past, Present and Future of Sumultaneous Localization and Mapping: Toward the Robust Perception Age," IEEE Transactions on Robotics, IEEE Service Center, Piscataway, NJ, US, vol. 32, No. 6, Dec. 1, 2016, pp. 1309-1332.

(Continued)

*Primary Examiner* — Ricky Chin
(74) *Attorney, Agent, or Firm* — Gennadiy Vinokur; James McAleenan; Hironori Tsukamoto

(57) ABSTRACT

A system for reconstructing a three-dimensional (3D) model of a scene including a point cloud having points identified by 3D coordinates includes at least one sensor to acquire a set of images of the scene from different poses defining viewpoints of the images and a memory to store the set of images and the 3D model of the scene. The system also includes a processor operatively connected to the memory and coupled with stored instructions to transform the images from the set of images to produce a set of virtual images of the scene viewed from virtual viewpoints; compare at least some features from the images and the virtual images to determine the viewpoint of each image in the set of images; and update 3D coordinates of at least one point in the model of the scene to match coordinates of intersections of ray back-projections from pixels of at least two images corresponding to the point according to the viewpoints of the two images.

17 Claims, 14 Drawing Sheets

(51) Int. Cl.
*G06T 7/579* (2017.01)
*G06T 7/246* (2017.01)

(56) References Cited

U.S. PATENT DOCUMENTS

2015/0243080 A1 8/2015 Steinbach et al.
2015/0381968 A1* 12/2015 Arora .................. G06T 17/00
348/47

OTHER PUBLICATIONS

Fuentes-Pacheco et al., Visual Simultaneous Localization and Mapping, A Survey, Artificial Intelligence Review, Springer Netherlands, vol. 43, No. 1. Nov. 13, 2012, pp. 55-81.
Gouda et al., "Vision based SLAM for Humanoid Robots: A survey," 2013 Second International Japan Egypt Conference on Electronics, Communications and Computers, IEEE, Dec. 17, 2013. pp. 170-175.

* cited by examiner

SYSTEM AND METHOD FOR VIRTUALLY-AUGMENTED VISUAL SIMULTANEOUS LOCALIZATION AND MAPPING

TECHNICAL FIELD

This invention relates generally to reconstructing a model of a scene, and more particularly to simultaneous localization and mapping (SLAM).

BACKGROUND

In robotic mapping, simultaneous localization and mapping (SLAM) is the computational problem of constructing or updating a map and/or a model of an unknown environment while simultaneously keeping track of an agent's location within the environment. While SLAM relates to the building of a map (mapping) and the use of the map (localization), a process associated with localization and a process associated with mapping need not actually be performed simultaneously for a system to perform SLAM. For example, procedures can be performed in a multiplexed fashion.

In some applications, e.g., in urban or indoor environment, GPS or another position estimation system is not available, practical or accurate enough for the SLAM. To that end, some systems, additionally or alternatively to the usage of specialized position estimation systems, rely on other line-of-sight sensors, like a camera, using a class of techniques named visual SLAM. Visual SLAM (VSLAM) uses visual sensor data or images as input to build a model of the environment, e.g., a point cloud representing the environment. For example, VSLAM uses line-of-sight sensors for acquiring images of surrounding environments and for registering multiple such images into a consistent coordinate system, e.g., a global coordinate system, to form a model describing both the geometry and appearance of surrounding environments.

VSLAM estimates the six degrees-of-freedom (DOF) poses (location and orientation) of the sensor inside that coordinate system using images captured by the sensor. To that end, VSLAM relies on the ability to find correspondences of a same physical region observed in different images. However, VSLAM suffers from the large-baseline matching problem, i.e., a region observed from two faraway views can be frequently missed during such matching process, because the appearances of the same region viewed from different viewpoints can change significantly.

Some methods address this problem by combining VSLAM techniques with separate pose estimation methods. For example, the method described in U.S. Pat. No. 7,162,338 uses motion sensors to estimate the pose of the robot carrying the camera. The usage of the motion sensors, although useful, is not always desirable.

Another method continuously tracks the pose of the sensors by taking multiple images ensuring small pose variation between the images, see, e.g., U.S. 20140126769. However, this method is computationally and memory expensive and can require the sensor to follow a laborious and complicated trajectory within an environment in order to construct its 3D model.

Accordingly, there is a need for VSLAM suitable for constructing a 3D model of the scene with a reduced number of images used for tracking the pose of the sensor. If given a same number of images, such VLSAM should achieve higher 3D reconstruction and pose estimation accuracy, as well as a larger number of reconstructed 3D points.

SUMMARY

It is an object of some embodiments to disclose a method for visual simultaneous localization and mapping (SLAM) that uses images as visual sensor data input for reconstructing a three-dimensional (3D) model of a scene. It is another object of some embodiments, to provide such a visual SLAM (VSLAM) that is suitable for constructing a 3D model of the scene with a reduced number of images used for tracking the pose of the sensor.

Some embodiments are based on recognition that in order to reduce a number of images for constructing the 3D map or 3D model of the scene, the images need to be acquired from relatively distant viewpoints. In such a manner, fewer images can be used to capture the intricacies of the scene. However, such an approach creates the large-baseline matching problem rooted in the pose tracking utilized by VSLAM. Specifically, a landmark observed from two spaced apart views can be missed by the VSLAM matching process, because the appearances of the same landmark viewed from different viewpoints can change significantly.

A simple example of this large-baseline matching problem follows. Suppose a visual SLAM map is built by moving a sensor, e.g., a camera, straight from a location A to a location B with the camera pointing towards the location B, referred to as a first trajectory. Suppose now the camera is turned 180 degrees to move from the location B to the location A while pointing towards the location A, referred to as a second trajectory. Then the VSLAM framework can fail to correctly localize the pose of this camera in the previously built map, because features newly observed in the second trajectory can be significantly different from features observed in the first trajectory that exist in the map.

Some embodiments are based on realization that virtual images can help to circumvent such a dependency of the VSLAM on appearance invariance. For example, during the model reconstruction, it is possible to synthesize some new virtual images from new views that might be visited in the future. To illustrate this principle using the above-mentioned example, it is possible to transform the images captured by the camera in the first trajectory pointing from the location A towards the location B into virtual images as viewed from virtual viewpoints in the second trajectory pointing from the location B towards the location A. The virtual images can be used for comparison with newly taken images by the camera in the second trajectory pointing from the location B to the location A to circumvent the large-baseline matching problem. Such a VSLAM is referred herein as a virtually-augmented visual SLAM (VA-VSLAM). The VA-VSLAM can construct similar models of the scene with fewer images, or better models with a same number of images, than a conventional visual SLAM. To that end, VA-VSLAM can reduce the computational power and memory usage and can simplify the trajectory followed by the sensor to map the environment.

Specifically, such virtual images can have different appearances of the features used as landmarks for pose tracking. However, because the virtual images are generated from the real images, the correspondences between the landmarks in the real and virtual images can be maintained regardless of their appearance. To that end, the newly captured real images can be compared with other real images with the help of the virtual images.

For example, a landmark in the new image can have an appearance similar to the appearance of the landmark in the virtual image, and thus such a landmark can be registered with the corresponding landmark in the virtual image. Further, the landmark in the virtual image is preregistered with the corresponding landmark in a different real image from which the virtual image is originated. In such a manner, the landmark from the newly acquired image can be registered with the landmark of the previous image through the virtual image. In such a manner, the large-baseline matching problem can be alleviated, which allows to construct a model of the scene using a fewer number of images.

Accordingly, one embodiment discloses a method for reconstructing a three-dimensional (3D) model of a scene from a set of images of the scene acquired by at least one sensor in different poses defining viewpoints of the images, wherein the 3D model includes a point cloud having points identified by 3D coordinates, wherein steps of the method are performed by a processor connected to a memory storing the set of images and coupled with stored instructions implementing the method, wherein the instructions, when executed by the processor carry out at least some steps of the method including transforming the images from the set of images to produce a set of virtual images of the scene viewed from virtual viewpoints; comparing at least some features from the images and the virtual images to determine the viewpoint of each image in the set of images; and updating 3D coordinates of at least one point in the model of the scene to match coordinates of intersections of ray back-projections from pixels of at least two images corresponding to the point according to the viewpoints of the two images.

Another embodiment discloses a system for reconstructing a three-dimensional (3D) model of a scene including a point cloud having points identified by 3D coordinates. The system includes at least one sensor to acquire a set of images of the scene from different poses defining viewpoints of the images; a memory to store the set of images and the 3D model of the scene; and a processor operatively connected to the memory and coupled with stored instructions to transform the images from the set of images to produce a set of virtual images of the scene viewed from virtual viewpoints; compare at least some features from the images and the virtual images to determine the viewpoint of each image in the set of images; and update 3D coordinates of at least one point in the model of the scene to match coordinates of intersections of ray back-projections from pixels of at least two images corresponding to the point according to the viewpoints of the two images.

Yet another embodiment discloses a non-transitory computer readable storage medium embodied thereon a program executable by a processor for performing a method for reconstructing a three-dimensional (3D) model of a scene from a set of images of the scene acquired by at least one sensor in different poses defining viewpoints of the images, wherein the 3D model includes a point cloud having points identified by 3D coordinates, the method includes transforming the images from the set of images to produce a set of virtual images of the scene viewed from virtual viewpoints; comparing at least some features from the images and the virtual images to determine the viewpoint of each image in the set of images; and updating 3D coordinates of at least one point in the model of the scene to match coordinates of intersections of ray back-projections from pixels of at least two images corresponding to the point according to the viewpoints of the two images.

DETAILED DESCRIPTION

Figure 1A:
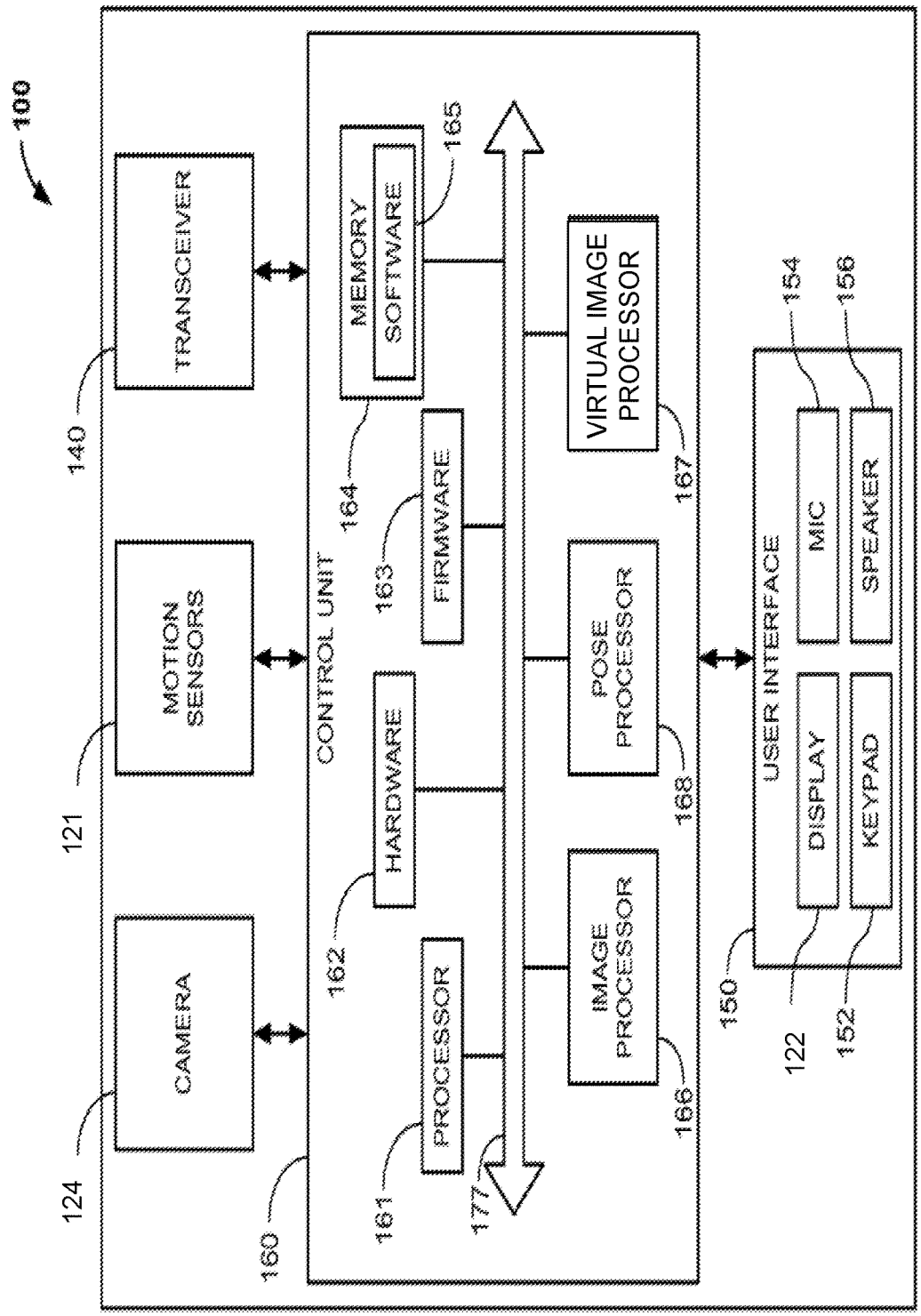
FIG. 1A shows a block diagram of a system suitable for a VA-VSLAM according to some embodiments.

FIG. 1A shows a block diagram of a system 100 suitable for a virtually-augmented visual simultaneous localization and mapping (VA-VSLAM) according to some embodiments. The system 100 can include a general purpose processor 161 and a memory 164. Additionally, or alternatively, the system 100 can include special purpose processors, such as an image processor 166, a pose processor 168, and a virtual image processor 167. The device 100 can also include a number of sensors coupled to one or more buses 177 or signal lines further coupled to at least one of the processors 161, 166, 167, and 168.

The system 100 can be part of a mobile device, wireless device, cell phone, personal digital assistant, wearable device (e.g., eyeglasses, watch, head wear, or similar bodily attached device), mobile computer, tablet, personal computer, laptop computer, or any type of device or a platform that has processing capabilities.

The system 100 can include sensors for capturing an image of a scene, such as cameras 124, 3D sensors, and/or combinations of cameras and 3D sensors, referred to as red-green-blue-depth (RGBD) sensors (not shown) and may optionally include motion sensors 121, such as accelerometers, gyroscopes, electronic compass, or other similar motion sensing elements. The system 100 can also capture images on a front and/or rear-facing camera (e.g., cameras 124). The system 100 can further include a user interface 150 that includes one or combination of a display 122, an input device, such as a keyboard and keypad 152. If desired, integrating a virtual keypad into the display 122 with a touch screen/sensor may obviate the keyboard or keypad 152. The user interface 150 can also include a microphone 154 and speaker 156, e.g., if the device 100 is a mobile platform such as a cellular telephone.

In some implementations, the system 100 can function as a mobile or wireless device and can communicate via one or more wireless communication links using a transceiver 140. The system 100 may include various other elements, such as a satellite position system receiver, power device (e.g., a battery), as well as other components typically associated with portable and non-portable electronic devices.

In one or more exemplary embodiments, the functions or modules described may be implemented in hardware (e.g., hardware 162), software (e.g., software 165), firmware (e.g., firmware 163), or any combination thereof of a controller 160. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1B:
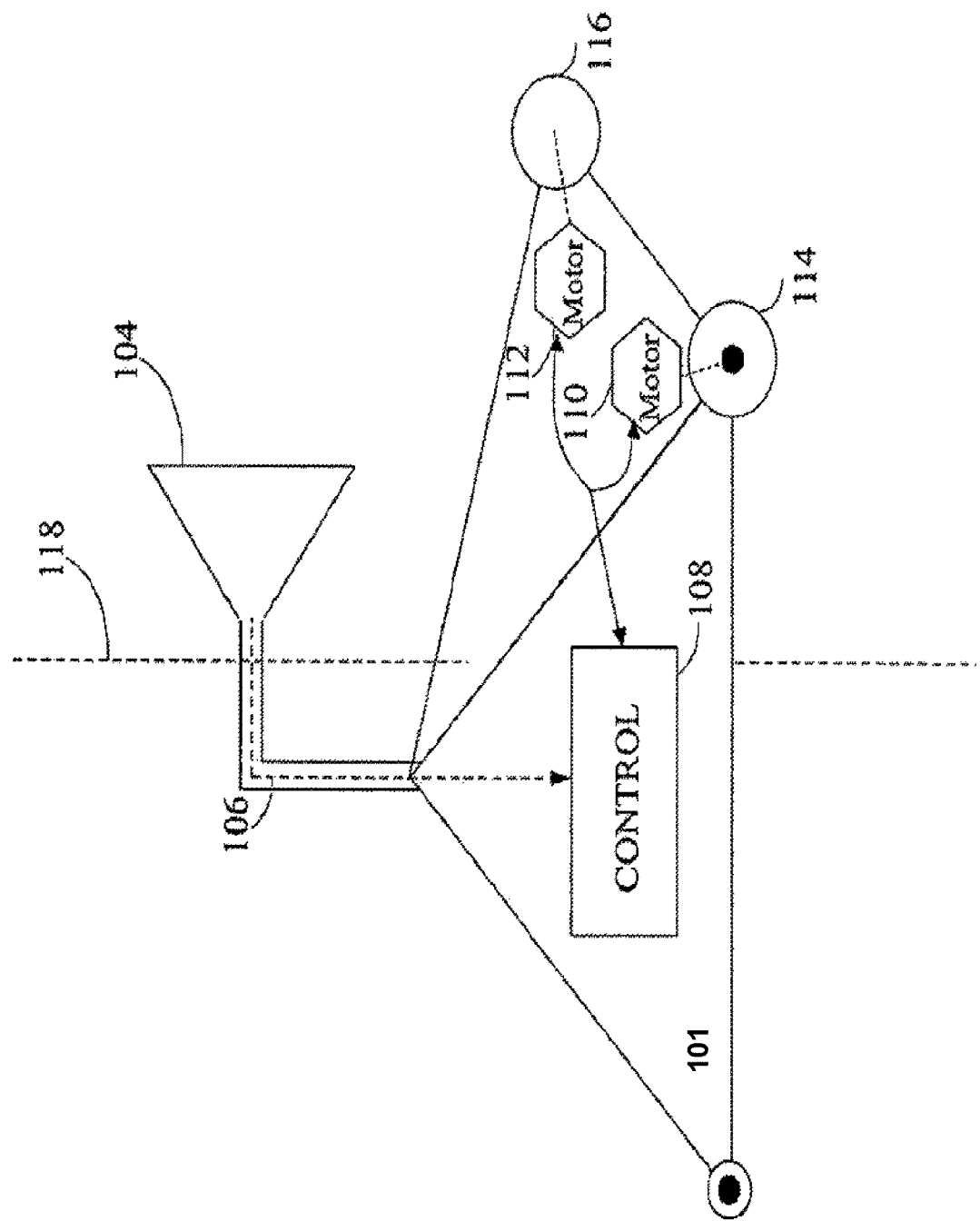
FIG. 1B illustrates a mobile robot in which a VA-VSLAM system can be incorporated as an example of the system according to some embodiments.

FIG. 1B illustrates a mobile robot 101 in which a VA-VSLAM system can be incorporated as an example of the system 100. The illustrated robot 101 includes a visual sensor 104, which is used to visually recognize landmarks such that a SLAM module can determine global position. A broad variety of visual sensors can be used for the visual sensor 104. For example, the visual sensor 104 can correspond to a digital camera with a CCD imager, a CMOS imager, an infrared imager, and the like. The visual sensor 104 can also correspond to a 3D sensor, such as a structured light sensor, a time-of-flight sensor, a LIDAR, and an RGBD sensor. The visual sensor 104 can include normal lenses or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. In another example, the visual sensor 104 can correspond to a single camera or to multiple cameras. In one embodiment, the VA-VSLAM system is advantageously configured to operate with a single camera, which advantageously reduces cost when compared to multiple cameras.

The motors 110, 112 of the illustrated robot 101 are coupled to wheels 114, 116 to provide locomotion for the robot 101. It will be understood by one of ordinary skill in the art that instead of or in addition to wheels, other embodiments of the robot can use different actuators, such as legs, tracks, rollers, propellers, and the like, to move around. In the illustrated embodiment, information regarding the rotation of the wheels, also known as odometry, is provided as an input to a control 108. Image data 106 from the visual sensor 104 is also provided as an input to the control 108 for the robot 101. In one embodiment, the VA-VSLAM system is embodied within the control 108. In the illustrated embodiment, the control 108 is coupled to motors 110, 112 to control the movement of the robot 101. For clarity, a power source for the robot 101, such as a battery, is not shown in FIG. 1B.

In response to the image data 106, the control 108 can provide control signals to the motors 110, 112 that control the movement of the robot 101. For example, the control 108 can provide control signals to instruct the robot to move forward, to stop, to move backward, to turn, to rotate about a vertical axis, and the like. When the robot rotates around a vertical axis, such as the exemplary vertical axis 118 shown in FIG. 1B, this rotation is referred to as "yaw." The pose of the robot defines the pose of the sensor 104 and used herein interchangeably. In addition, the pose of the camera defines the viewpoint of an image captured by the sensor. To that end, the pose of the robot, the pose of the sensor, and the viewpoint of the image are related and include the position, e.g., the position of the sensor and/or the robot, and the orientation of the camera or heading of the robot within the global reference frame.

Figure 1C:
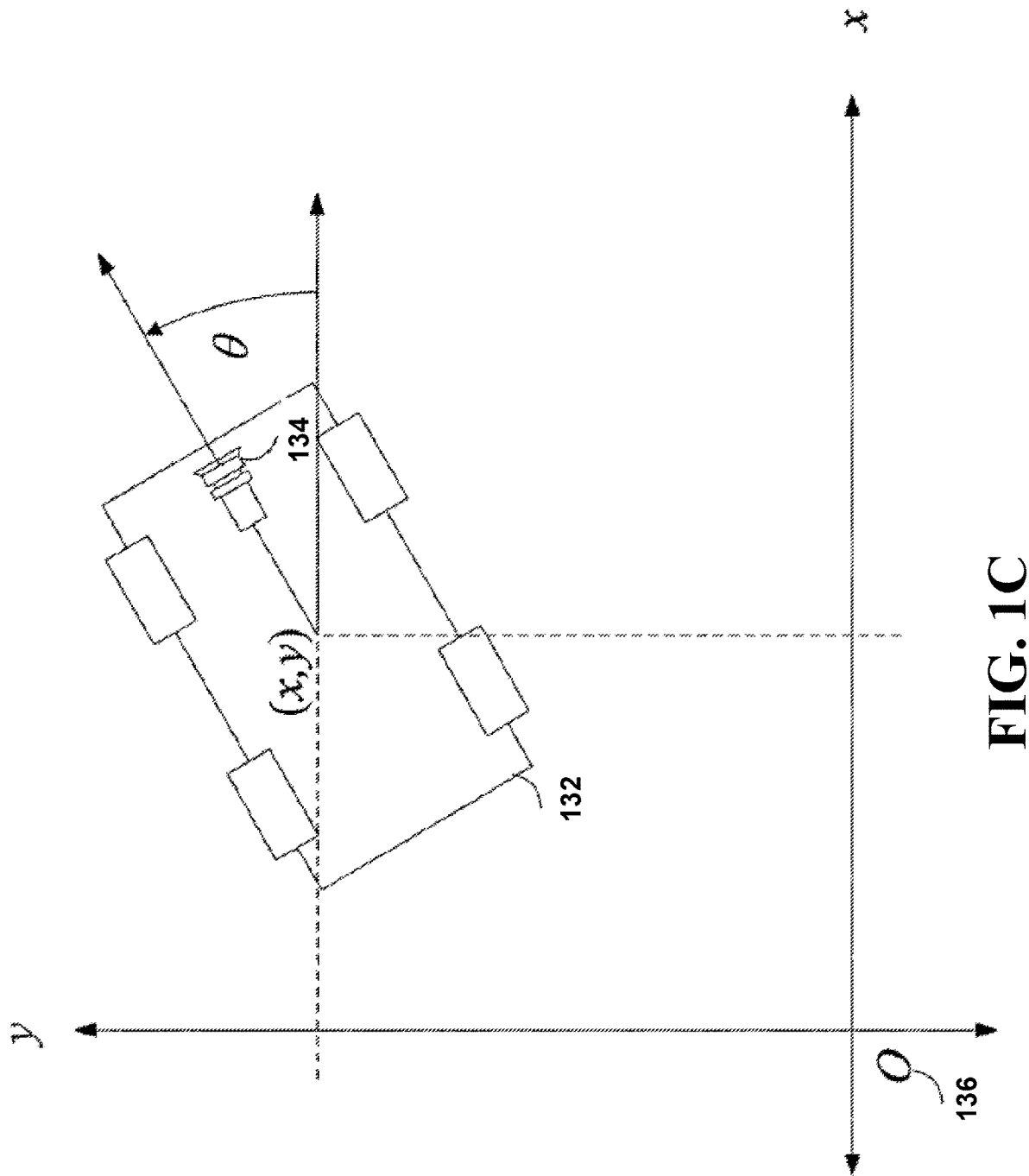
FIG. 1C illustrates an exemplar position (x,y) of the pose of a robot and/or a sensor in a global reference frame as used by some embodiments.

FIG. 1C illustrates an exemplar position (x,y) of the pose of a robot 132 and/or a sensor 134 in a global reference frame as used by some embodiments. It will be understood that the position does not have to correspond precisely to the center of the robot 132, as the robot 132 occupies an area of space larger than a point. A zero vector 136 for the global reference frame can correspond to one of a variety of locations within an environment. In the illustrated examples, the zero vector 136 for the global reference frame is set at the location where the robot 132 is initialized. In one embodiment, the x-direction for this global reference frame corresponds to an axis directly in front of the robot when the robot was initialized.

For example, in the illustrated embodiment, the x-axis corresponds to the path traveled by the robot when the robot travels directly in the forward direction upon initialization at the zero vector 136. In the illustrated embodiment, the y-direction corresponds to an axis orthogonal to the x-axis, with the positive y-axis increasing to the left of the x-axis when viewed from above. It will be understood that the zero vector for reference frame and the alignment of the x-axis and the y-axis with respect to the zero vector can depend on where the robot is located and the orientation of the robot at the time the zero vector is set, such as, for example, at the time of initialization.

FIG. 1C also illustrates an orientation of the pose of a robot in a global reference frame. In the illustrated embodiment, the orientation $\theta$ for the robot is referenced to the initial heading that the robot had when the zero vector was set. Advantageously, the location of the robot and the initial orientation for the robot is arbitrary, thereby simplifying setup of the robot for the user.

In addition to displacement along the x-axis direction or the y-axis direction, a typical mobile robot can also rotate or "yaw" about a vertical axis. It will be understood that robots do not have to directly rotate or yaw to change orientation. For example, the act of turning around a corner also changes the orientation or heading of the robot. In some implementations, the sensor 134 is rotatable mounted on the robot 132, so the sensor 134 can change its orientation independently or additionally to the orientation of the robot.

The above illustrated embodiment has been described for a mobile robot moving on a planar ground, having a 3-DOF pose (2-DOF position and 1-DOF orientation). In this case, the VA-VSLAM framework can estimate the 3-DOF pose by considering the other DOF, i.e., 1-DOF position along a z-axis direction and 2-DOF orientations corresponding to "roll" and "pitch," to be zero. In some other embodiments, the system and/or the sensor can move arbitrarily in the 3D space and the VA-VSLAM framework estimates a 6-DOF pose of the sensor. Such a case includes a system installed on a robot flying in the 3D space or moving on a non-planar ground, and a system installed on a portable platform hand-held by a human operator.

Figure 2A:
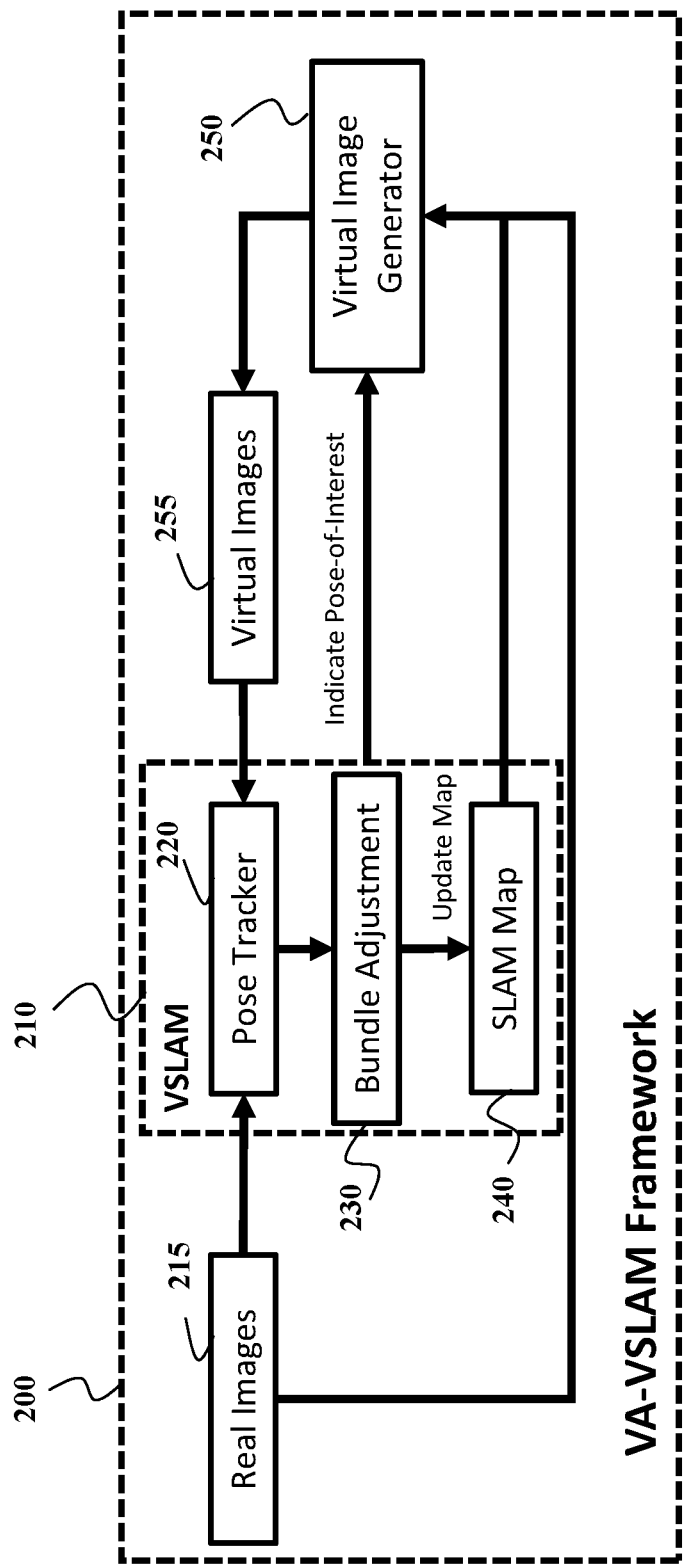
FIG. 2A shows a block diagram of a VA-VSLAM framework according to some embodiments.

FIG. 2A shows a block diagram of a VA-VSLAM framework 200 according to some embodiments taking advantage of visual SLAM framework 210 to estimate both one or more cameras' 6-DOF poses (positions and orientations) and a 3D description of the geometric surroundings. The VA-VSLAM framework works by matching between a set of features on the currently observed real images (with or without depth) captured by the cameras and/or sensors 124 from some real viewpoints, and a set of features on the virtually generated images observed by a virtual camera from some virtual viewpoints. Steps of the method can be performed by a processor, such as the general processor 161 and/or specialized processors 166, 167, and 168 connected to a memory, such as the memory 164, storing the set of images and coupled with stored instructions, such as the software 165 implementing the method. The instructions, when executed by the processor carry out at least some steps of the method of the VA-VSLAM framework 200.

The visual SLAM framework 210 works as follows. A set of real frames, $\{\mathcal{F}_i\}$ of the images, are processed by some feature extractors to select a set of features, $f^i \triangleq \{f_j^i\}$, on each frame $\mathcal{F}_i$ of an image. A frame $\mathcal{F}_i$ can include a regular 2D image with one channel of gray information or three channels of RGB information and/or a 3D image with four channels of RGBD information where the fourth channel describes the depth of the pixel, i.e., the distance along the camera's viewing direction between the camera center and the closest object along the ray direction of that pixel. A process of determining the ray direction of a pixel is known as a back-projection of the pixel, and can be performed by using intrinsic parameters of the camera. For example, a feature $f_j^i$ can be either a 2D point if frame $\mathcal{F}_i$ is a 2D image, or a 3D point if frame $\mathcal{F}_i$ is a 3D image, as long as this feature is significantly different from its neighbor regions either in geometry or in appearance. Examples of feature extractors include Harris, FAST or ORB key point detectors.

Then this feature set f$^i$ are matched against another set of features f$^i$' to find corresponding feature pairs $\{(j, j')\}$ such that feature $f_j^i$ and feature $f_{j'}^{i'}$ correspond to a same physical region, termed as a landmark or an interest point, in the scene. Such matching can be done through various feature description methods such as Scale Invariant Feature Transform (SIFT), which localizes interest points and generates their descriptions, Speed Up Robust Features (SURF), Gradient Location-Orientation histogram (GLOH), ORB, or other comparable techniques and/or sampling-based methods such as RANSAC.

Using the corresponding feature pairs, the visual SLAM 210 can track the pose 220 of this frame $\mathcal{F}_i$, with respect to either one previously observed frame $\mathcal{F}_k$ or a map 240 $M \triangleq \{f^k; k=0, \ldots, n\}$ containing all previously observed frames, depending on how the feature set f$^i$ is constructed. The tracked pose and feature correspondences are sent to a bundle adjustment 230 to find out the best 6-DOF poses of frames and 3D geometry descriptions of features used to further update the map 240.

Given a set of images depicting a number of 3D points from different viewpoints, the bundle adjustment 230 can be defined as the problem of simultaneously solving one or combination of refining the 3D coordinates describing the scene geometry, the parameters of the relative motion of the camera, and the optical characteristics of the camera(s) employed to acquire the images, according to an optimality criterion involving the corresponding image projections of all points.

In one embodiment, bundle adjustment includes minimizing the reprojection error between the image locations of observed and predicted image points, which is expressed as the sum of squares of a large number of nonlinear, real-valued functions. Thus, the minimization is achieved using nonlinear least-squares methods. For example, one embodiment uses Levenberg-Marquardt optimization due to its ease of implementation and its use of an effective damping strategy that lends it the ability to converge quickly from a wide range of initial guesses. By iteratively linearizing the function to be minimized in the neighborhood of the current estimate, the Levenberg-Marquardt method involves the solution of linear systems termed the normal equations. When solving the minimization problems arising in the framework of bundle adjustment, the normal equations have a sparse block structure owing to the lack of interaction among parameters for different 3D points and cameras. This can be exploited to gain computational benefits by employing a sparse variant of the Levenberg-Marquardt method which explicitly takes advantage of the normal equations zeros pattern, avoiding storing and operating on zero-elements.

The VA-VSLAM of some embodiments aims to reduce a number of images 215 acquired for constructing the 3D map or 3D model of the scene 240. To that end, some embodiments are based on recognition that the images 215 need to be acquired from relatively distant viewpoints. In such a manner, fewer images can be used to capture the intricacies of the scene. However, such an approach creates the large-baseline matching problem rooted in the pose tracking 220. Specifically, a landmark observed from two spaced apart views can be missed by the VSLAM matching process, because the appearances of the same landmark viewed from different viewpoints can change significantly.

A simple example of this large-baseline matching problem follows. Suppose a visual SLAM map is built by moving a camera straight from a location A to a location B with the camera pointing towards the location B, referred to as a first trajectory. Suppose now the camera is turned 180 degrees to move from the location B to the location A while pointing towards the location A, referred to as a second trajectory. Then the VSLAM framework can fail to correctly localize the pose of this camera in the previously built map, because features newly observed in the second trajectory can be significantly different from features observed in the first trajectory that exist in the map.

Some embodiments are based on realization that virtual images can help to circumvent such a dependency of the VSLAM on appearance invariance. For example, during the model reconstruction, it is possible to synthesize some new virtual images from new views that might be visited in the future. To illustrate this principle using the above-mentioned example, it is possible to transform the images captured by the camera in the first trajectory pointing from the location A towards the location B into virtual images as viewed from virtual viewpoints in the second trajectory pointing from the location B towards the location A. The virtual images can be used for comparison with newly taken images by the camera in the second trajectory pointing from the location B to the location A to circumvent the large-baseline matching problem.

Specifically, such virtual images can have different appearances of the features used as landmarks for pose tracking. However, because the virtual images are generated from the real images, the correspondences between the landmarks in the real and virtual images can be maintained regardless of their appearance. To that end, the newly captured real images can be compared with other real images with the help of the virtual images.

For example, a landmark in the new image can have an appearance similar to the appearance of the landmark in the virtual image, and thus such a landmark can be registered with the corresponding landmark in the virtual image. Further, the landmark in the virtual image is preregistered with the corresponding landmark in a different real image from which the virtual image is originated. In such a manner, the landmark from the newly acquired image can be registered with the landmark of the previous image through the virtual image. In such a manner, the large-baseline matching problem can be alleviated, which allows to construct a model of the scene using a fewer number of images.

To that end, the VA-VSLAM framework 200 includes a virtual image generator 250 to apply the concept of virtual frames or images 255 to address the above-mentioned limitations. The VA-VSLAM explicitly transforms the observed features on real images to features on virtually observed images, instead of merely relying on the limited viewpoint invariance of existing feature matching methods.

The virtual frame generator 250 transforms the images 215 to produce virtual images $\{V_i\}$ 255 of the scene viewed from virtual viewpoints. These virtual images are then submitted to the visual SLAM 210 to extract virtual features $\{v_j^i\}$ to help the pose tracker improve localization robustness and accuracy, and to augment the SLAM map as $\psi \triangleq \{f^k \cup v^l;\ k=0, \ldots, n,\ l=0, \ldots, m\}$.

Figure 2B:
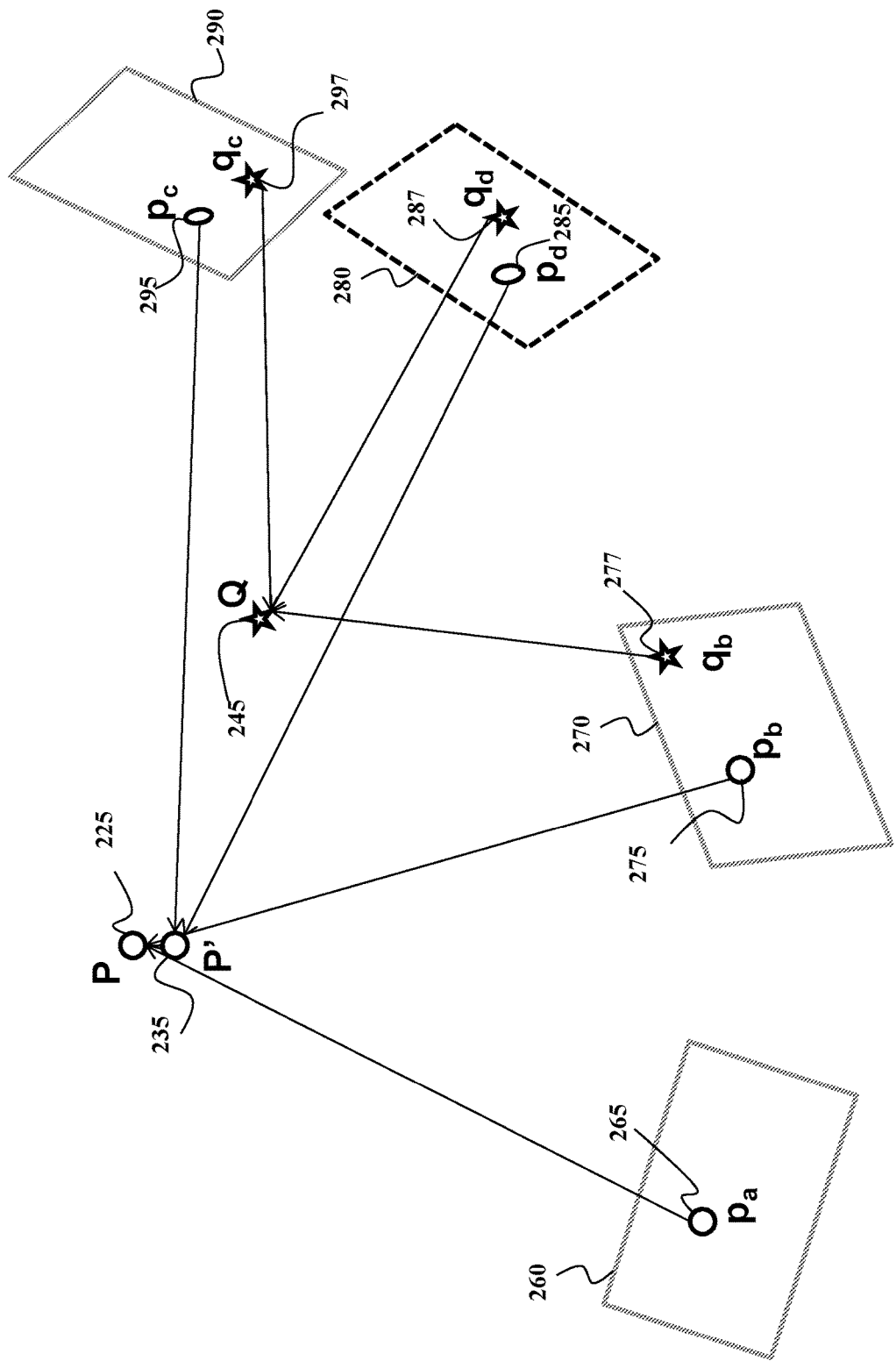
FIG. 2B shows an example of a schematic of addressing the large-baseline matching problem using virtual images according to some embodiments.

FIG. 2B shows an example of a schematic of addressing the large-baseline matching problem using virtual images according to some embodiments. In this example, the images 260, 270, and 290 are real images acquired by at least one sensor having different poses, i.e., the images 260, 270, and 290 have different viewpoints. Note that the images are acquired by a same sensor or multiple sensors, i.e., each image might be acquired by a different sensor. The image 280 is a virtual image having a virtual viewpoint. The viewpoints of the images 260 and 270 are relatively close to each other. To that end, the images 260 and 270 include landmarks 265 and 275 corresponding to the same feature in the scene, i.e., the pixels of the landmarks 265 and 275 correspond to the same point P in the scene, and have similar geometry and/or appearance. Using a triangulation or any other suitable computational technique, it is possible to compute the coordinates 225 of the point P in the scene. However, when only two images are used for determining the coordinates of the point P, such coordinates might be inaccurate.

The image 290 also includes landmark 295 representing the same point P in the scene as the landmarks 265 and 275. However, the viewpoint of the image 290 is so different from the viewpoints of the images 260 and 270 that the landmark 295 has different appearance and cannot be matched with the landmarks 265 and 275. However, the viewpoint of the virtual image 280 is closer to the viewpoint of the image 290 and the landmark 285 that corresponds to the same point P as landmarks 265 and 275 has more similar appearance to the landmark 295 and can be matched with the landmark 295. In such a manner, some embodiments can determine that the landmarks 265, 275, and 295 correspond to the same point P in the scene. To that end, the pose of the image 290 can be used to update the coordinates of the point P to the coordinates 235 of the point P'. In such a manner, the usage of the virtual image increases the accuracy of the model of the scene.

Similarly, the image 270 includes a landmark 277 corresponding to a point Q in the scene. The image 290 also includes landmark 297 representing the same point Q in the scene as the landmarks 277. However, the viewpoint of the image 290 is so different from the viewpoints of the image 270 that the landmark 297 has different appearance and cannot be matched with the landmark 277. To that end, the coordinates of the point Q are unknown and the point Q cannot be added to the model of the scene.

However, the viewpoint of the virtual image 280 is closer to the viewpoint of the image 290 and the landmark 287 that corresponds to the same point Q as the landmark 277 has more similar appearance to the landmark 297 and can be matched with the landmark 297. In such a manner, some embodiments can determine that the landmarks 277 and 297 correspond to the same point Q in the scene. To that end, pose of the image 290 can be used to determine the coordinates 245 of the point Q and the point Q can be added to the model of the scene. In such a manner, the usage of the virtual image increases the density of the model of the scene with fewer images than otherwise would require.

Figure 2C:
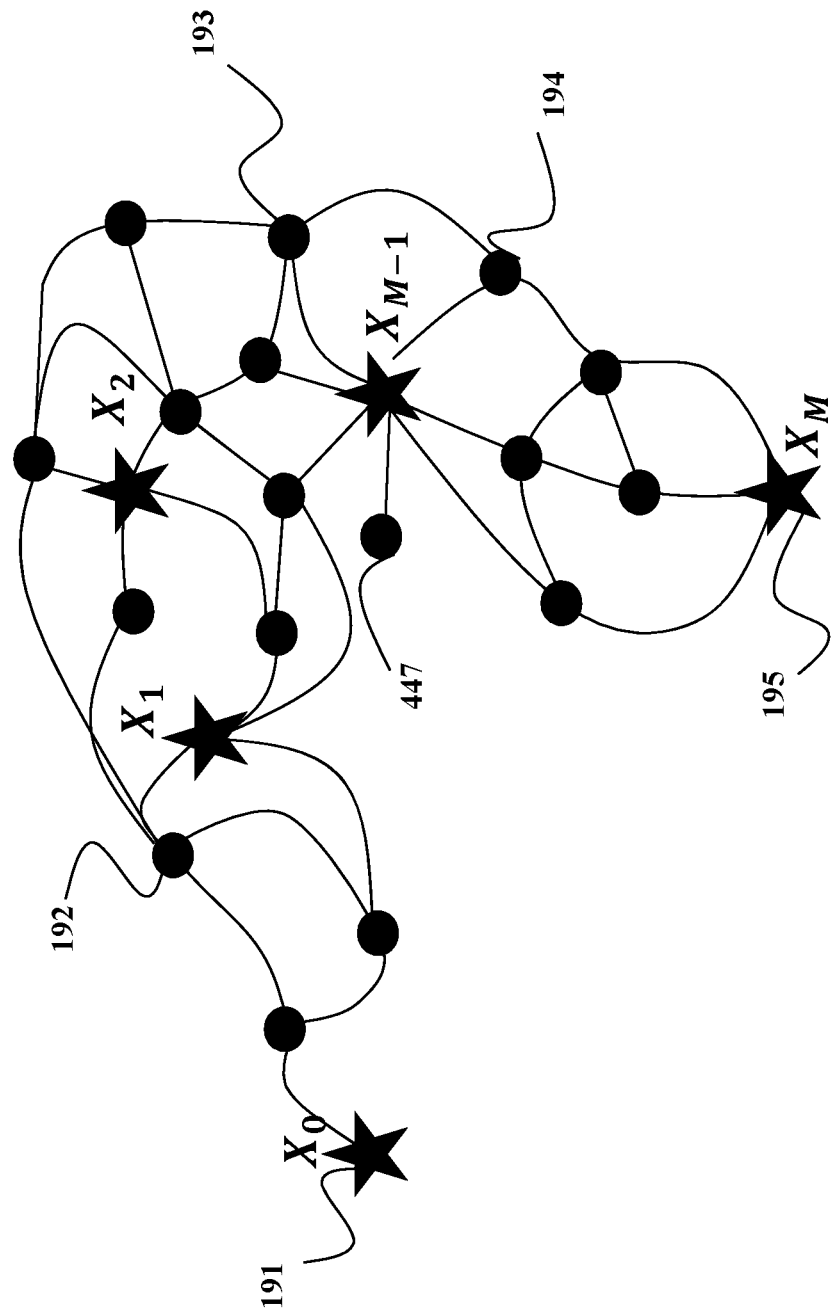
FIG. 2C shows an exemplar schematic of possible trajectories through the environment.

FIG. 2C shows an exemplar schematic of possible trajectories of the system 100, e.g., a robot 101, through the environment. In this example, without the utilization of virtual images for construction of the model of the scene in the environment, the robot 101 needs to acquire images at each state depicted using circles and stars, such as states 191, 192, 193, 194, 195. However, using the virtual images, the robot 101 can acquire images only at the states $\{X_0, X_1, X_2, \ldots X_{M-1}, X_M\}$ depicted as stars, and perform localization and mapping with the help of virtual images generated at the states depicted as circles. In such a manner, the usage of the virtual images reduces the number of real images to allow the sparse modeling of the scene.

Figure 3A:
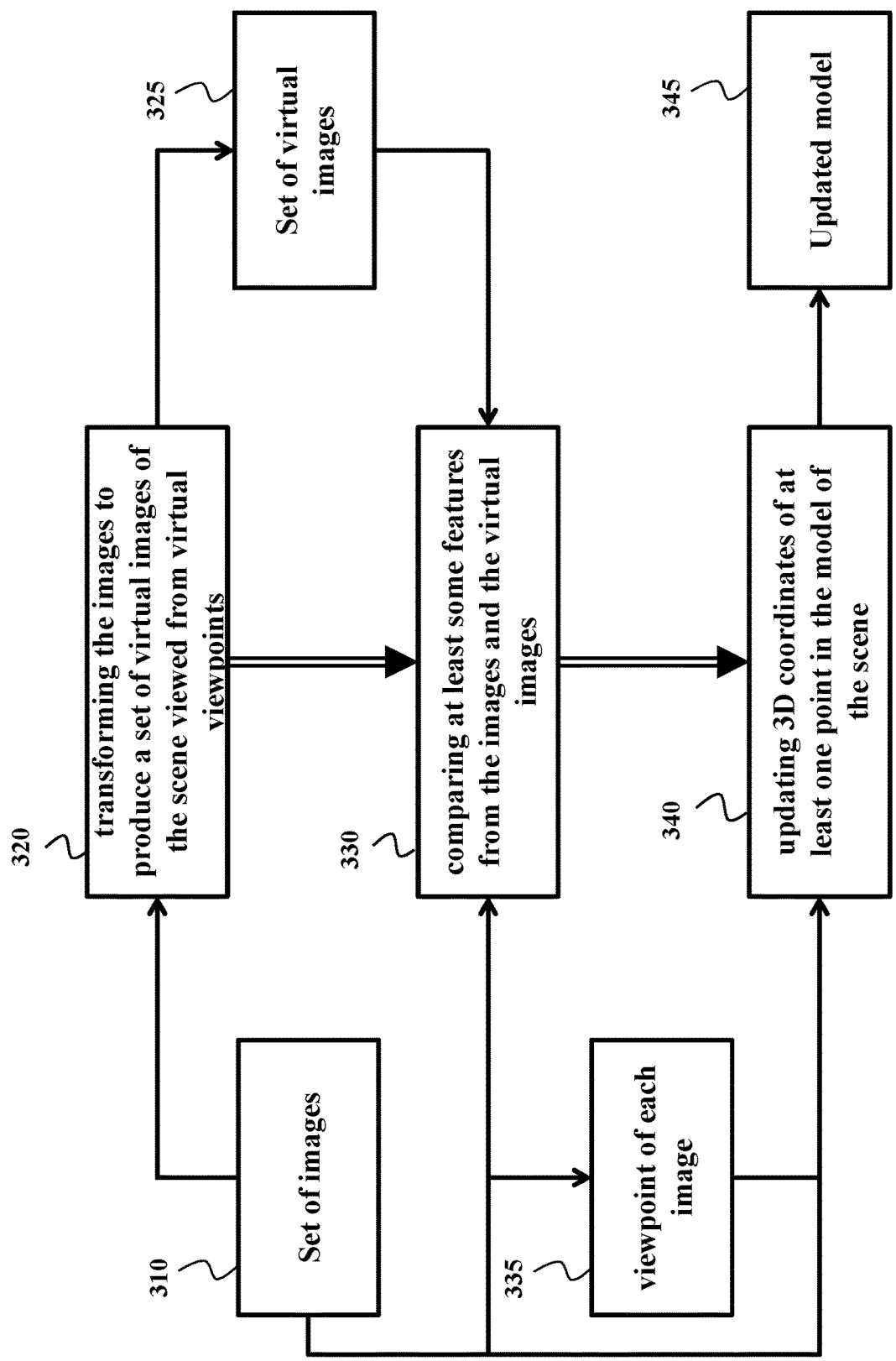
FIGS. 3A and 3B show block diagrams of a method for reconstructing 3D model of a scene from a set of images of the scene according to some embodiments.

FIG. 3A shows a block diagram of a method for reconstructing 3D model of a scene from a set of images of the scene according to some embodiments. The set of images is acquired by at least one sensor in different poses defining viewpoints of the images. The 3D model includes a point cloud having points identified by 3D coordinates. Steps of the method are performed by a processor connected to a memory storing the set of images and coupled with stored instructions implementing the method. The instructions, when executed by the processor carry out at least some steps of the method.

The method transforms 320 the images from the set of images 310 to produce a set of virtual images 325 of the scene viewed from virtual viewpoints. The sizes of the sets 310 and 325 can be the same or different. In one embodiment, the virtual images are generated as needed when the real images from the set 310 are failed to be matched to each other. Additionally, or alternatively, the virtual images can be generated proactively.

To that end, different embodiments adopt different strategies for selecting virtual viewpoints for generating virtual images. For example, one embodiment samples some valid poses in the 6-DOF camera pose space, e.g., randomly or deterministically. Such sampling can be either uniform across the pose space, or biased towards unvisited regions.

Another embodiment uses the existing real viewpoints of the real images to estimate a set of possible poses in the future. This embodiment is advantageous for the mobile robot example of FIG. 1B, when the trajectory of the mobile robot is predetermined.

Yet another embodiment maintains the positions of the existing real viewpoints, but rotates each real viewpoint around its position such that the virtual viewpoints have different orientations from the real viewpoint but are defined at the same position as the real viewpoint. Virtual images generated at those virtual viewpoints can have different appearances from the real image, because (1) the real and virtual viewpoints can use different projection models, e.g., the real viewpoint may use a fish-eye projection model while the virtual viewpoint may use a perspective projection model; and (2) even if both the real and virtual viewpoints use a same perspective projection model, the perspective projection model samples rays uniformly on a plane (i.e., an image sensor plane), not uniformly in an angular domain, thus the different orientations of the virtual viewpoints sample different sets of rays. This is more apparent when the field of view of the camera is larger: In a perspective image with a large field of view, peripheral regions of the image appear to be stretched compared to a center region of the image, which is referred to as a perspective distortion. Therefore, this embodiment is advantageous when the system uses several different sensors, e.g., a fish-eye camera and a perspective camera, a 3D sensor and a perspective camera, or multiple perspective cameras with different intrinsic parameters.

Next, the method compares 330 at least some features from the images 310 and the virtual images 325 to determine the viewpoint 335 of each image in the set of images and updates 340 3D coordinates of at least one point in the model 345 of the scene to match coordinates of intersections of ray back-projections from pixels of at least two images corresponding to the point according to the viewpoints of the two images. For example, because different pixels from different images 310 are matched to each other, some embodiments can use stereo triangulation and/or sheet of light triangulation to determine the depth of the scene.

Figure 3B:
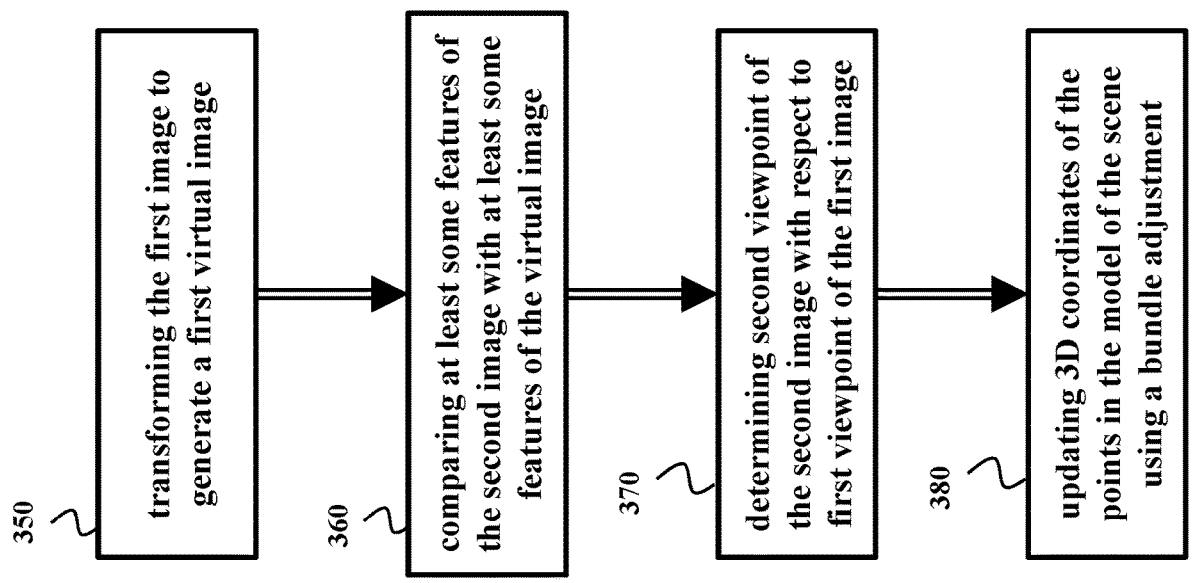

FIG. 3B shows a block diagram of a method for reconstructing 3D model of a scene according to some embodiments, in which the set of images includes a first image of the scene viewed by the camera in a first pose defining a first viewpoint and includes a second image of the scene viewed by the camera in a second pose defining a second viewpoint.

The method transforms 350 the first image to generate a first virtual image corresponding to a virtual viewpoint different from the first viewpoint. Notably, the transforming preserves correspondence between at least some pixels of the first image and the virtual image to represent the same points of the scene. Next, the method compares 360 at least some features of the second image with at least some features of the virtual image to determine a correspondence among at least some pixels of the second image, the virtual image, and the first image. Such a correspondence allows for matching landmarks from the second image to the landmarks of the first image even if those landmarks have different appearance.

The method determines 370 the second viewpoint of the second image with respect to the first viewpoint of the first image using a subset of the correspondent pixels from the first and the second images based on coordinates of the subset of pixels from the second image and coordinates of points of the scene corresponding to the subset of pixels from the first image. Next, the method updates 380 3D coordinates of the points in the model of the scene using a bundle adjustment of corresponding pixels in the first and the second images.

The determination of the second viewpoint takes advantage from the fact that rays back-projected from the corresponding pixels in the first and second images should intersect at a 3D point. For example, if the viewpoints of the images 260 and 270 are known, the coordinates of the point P 225 can be determined via triangulation, i.e., as an intersection of the two rays. Alternatively, if the viewpoint of the image 260 and the coordinates 225 are known, 2D-to-3D registration methods can determine the viewpoint of the image 270 so that the rays can pass through the corresponding 3D points. Such 2D-to-3D registration methods are known as perspective-n-point methods.

For example, some embodiments use a 3D sensor to initialize the coordinates of the points of the model of the scene corresponding to the subset of pixels from the first image. Examples of the 3D sensor include Kinect-like RGBD cameras, or stereo cameras. Additionally, or alternatively, some embodiment can use multiple images with similar viewpoints to initialize the coordinates of the points in the model.

Figure 4A:
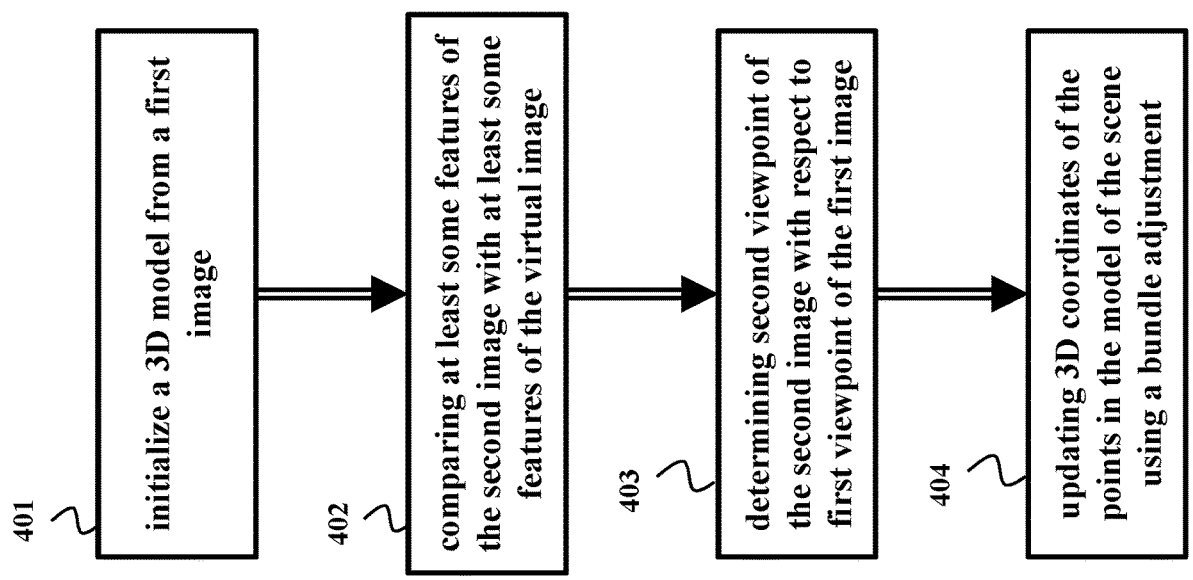
FIG. 4A shows a flow diagram of VA-VSLAM initialization according to one embodiment of the VA-VSLAM.

FIG. 4A shows a flow diagram of initialization according to one embodiment of the VA-VSLAM. At block 401, the embodiment may initialize a 3D model from a first image (e.g., a single reference image) and prior to processing a subsequent image. For example, initializing a first image (e.g., a single reference image captured from camera 124) may include determining a set of interest points in three-dimensional space with an initial estimated depth. In some embodiments, the initialization may occur immediately, in real-time, near real-time, or within a short time window of the reference image capture.

In one implementation, the embodiment creates a model from an initial captured reference image. The model as used herein may also be understood to be a map of a 3D object or scene. The embodiment can create a target from a single image from a single camera sensor or monocular source. The model may be stored in memory (e.g., in memory 164 of device 100) and represented by or associated with one or more 3D interest points extracted or calculated from an image. In some embodiments, the 3D model may be initialized without any user input when selecting an initial reference image or a second reference image.

At block 402, the embodiment processes one or more subsequent images. Processing may include determining a set of landmarks within each of the subsequent images. In some embodiments, the set of landmarks may be the same landmarks determined after processing the reference image; however, the location and depth values may be different than the reference image. The processing can also include generating virtual images with different appearances of the landmarks.

At block 403, the embodiment tracks the 3D target in six degrees of freedom. The tracking may occur immediately, instantaneously, in real-time, near real time, or within a short time period following the receipt of the first single reference image. In some embodiments, the initialization may be readily apparent to an augmented reality user because a 3D model may be initialized instantly, in real-time, near real time, or within a short time period of frame capture. The system 100 can display a representation of the target while tracking, as described in greater detail below.

At block 404, the embodiment updates the 3D model based on the processing of the one or more subsequent images. The embodiment determines whether the landmarks may be estimated and incrementally refines the model over a sequence of movements of the camera. In one implementation, the embodiment may provide a camera motion estimate for initial small motions by approximating the target to a plane having assumed depth values. Also, in implementations where the target is approximated with a plane, the step of explicitly solving for epipolar geometry (which may be dependent on having enough translation) can be omitted to provide continuous camera 124 tracking from the first reference image onwards.

Figure 4B:
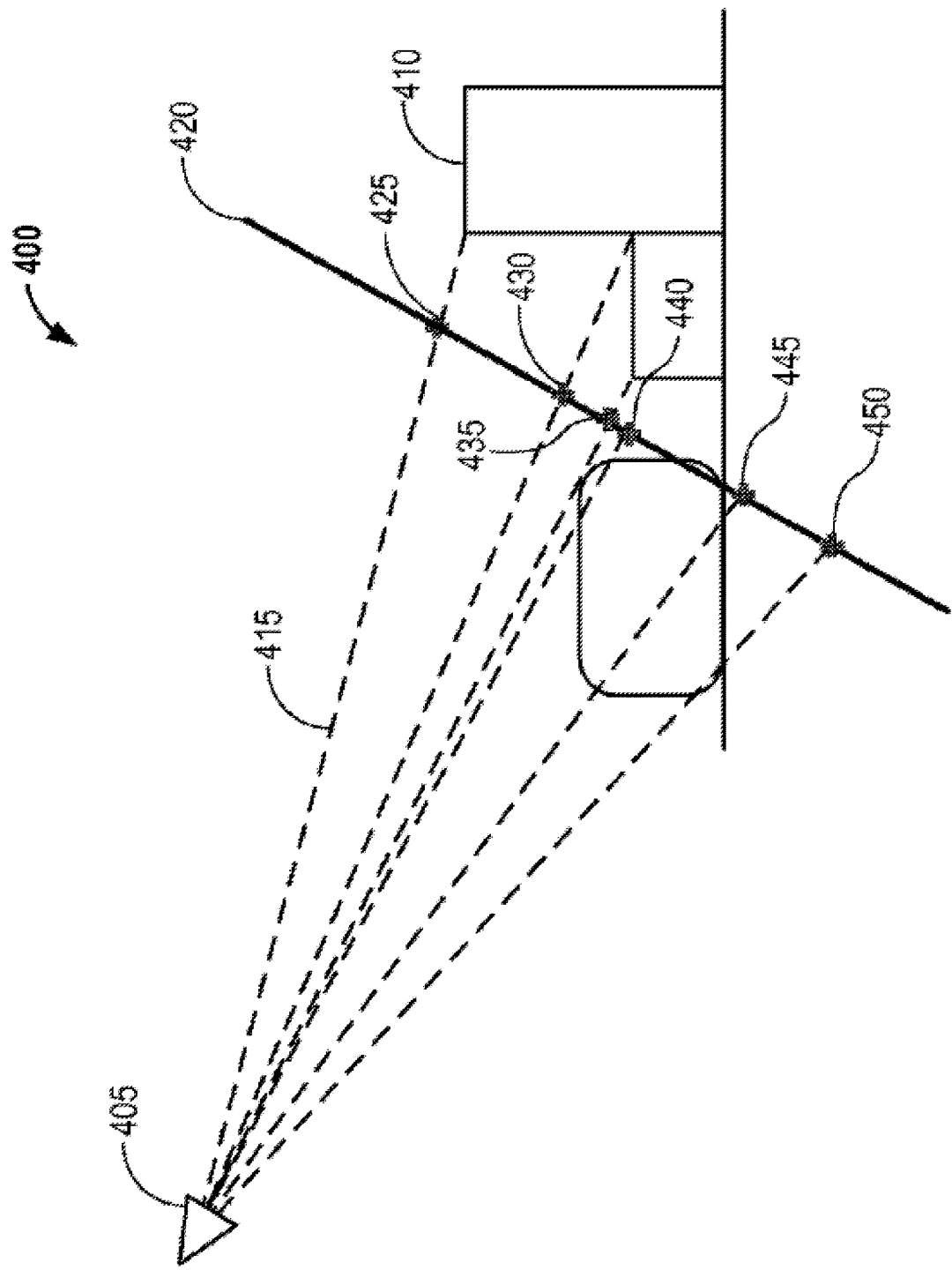
FIG. 4B shows a side schematic view of a camera capturing an image of a scene initialized with a plane according to one embodiment.

FIG. 4B shows a side schematic view of a camera capturing an image of a scene initialized with a plane according to one embodiment. In this initialization, the set of landmarks, e.g., landmarks 425, 430, 435, 440, 445, and 450, is initialized on a plane 420 at a pre-defined initial distance, as viewed from camera 124 at position 405. Each landmark can be associated with an initial depth, such that all landmarks are initially on the same plane (e.g., points 425, 430, 435, 440, 445, and 450 on the single plane 420).

In other embodiments, the landmarks may be initialized with any other geometric shape, or any arrangement of initialized depth values. For example, the embodiments may determine that another geometric shape should be the baseline starting point for the target, and refine as more target information is discovered. Furthermore, instead of every landmark having the same depth value, the initialized depth values may be individually estimated or determined by other techniques as known in the art. For example, the initial depth values may be a range of values such that the average landmark depth falls within a predetermined threshold average depth.

FIG. 4B also illustrates objects (e.g., object 410) representing the 3D scene observed by camera 124. Line 415 illustrates the ray under which a landmark 425 associated with object 410 is seen (e.g., the landmark 425 associated with the edge of object 410 has an initial equal depth as other landmarks detected on the plane 420). The distance from camera 124 at position 405 to landmark 425 along line 415 is the assumed depth of landmark 425.

Figure 4C:
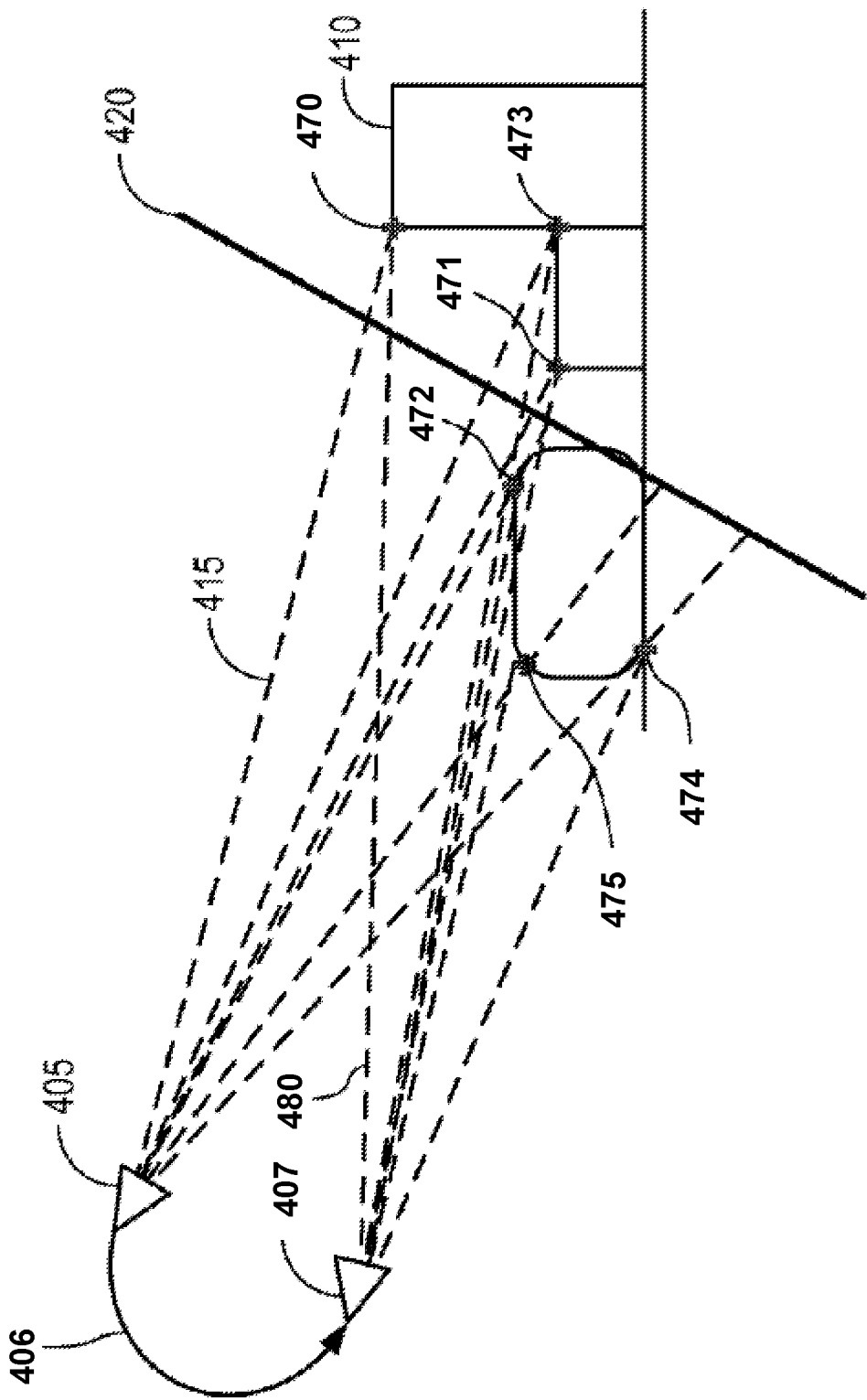
FIG. 4C illustrates a side schematic view of a camera after a camera movement to a different pose.

FIG. 4C illustrates a side schematic view of a camera 405 after a camera movement 406 to a pose 407 capturing a second image that allows for more accurate (i.e., updated) landmark depths for each of a set of points 470, 471, 472, 473, 474, and 475 observed by the camera 124 at the pose 407. The ray 480 corresponds to the ray 415 under which an updated landmark 470 is seen. In such a manner, the 3D coordinates of points in the model of the scene are updated to match coordinates of intersections of ray back-projections from pixels of at least two images corresponding to the point according to the viewpoints of the two images.

Some embodiments use two real images to initialize the coordinates of the points of the model of the scene corresponding to the subset of pixels from the first image. For example, in one embodiment, the set of images includes a third image of the scene viewed by the camera in a third pose defining a third viewpoint. The embodiment compares features of the first and the third images to determine pixels of the first and the third images corresponding to the same points in the scene and determines the coordinates of points of the scene corresponding to the subset of pixels, as well as the third pose with respect to the first pose, using a relative pose estimation method. Such relative pose estimation includes one or combination of a five-point method, a seven-point method, and an eight-point method, and works with at least five 2D-to-2D pixel correspondences between the first and third images. Note that those 2D-to-2D pixel correspondences can be obtained via virtual images generated from the first and/or third images as described above, not necessarily by directly matching the two real (first and third) images.

Different embodiments use different methods to generate a virtual frame given a virtual viewpoint, depending on both the virtual viewpoint and data type of real frames of the system. For example, when a frame includes 3D information, e.g., the frame includes an RGBD image; the virtual image can be directly generated from a dense point cloud describing the scene. For example, in one implementation, a textured mesh model of this scene can be created from the map or the model of the scene. Then this textured mesh is submitted to a graphics pipeline such as OpenGL, with the virtual camera's pose (i.e., model-view matrix in OpenGL's term) set to the given pose of interest, and its projection matrix is set by a desired camera intrinsic matrix, usually identical or close to that of the real camera. At this point, the RGB information is extracted from the color buffer of the OpenGL pipeline and depth information from the depth buffer. Thus a virtual frame of RGBD image is generated at the desired virtual viewpoint.

Figure 5A:
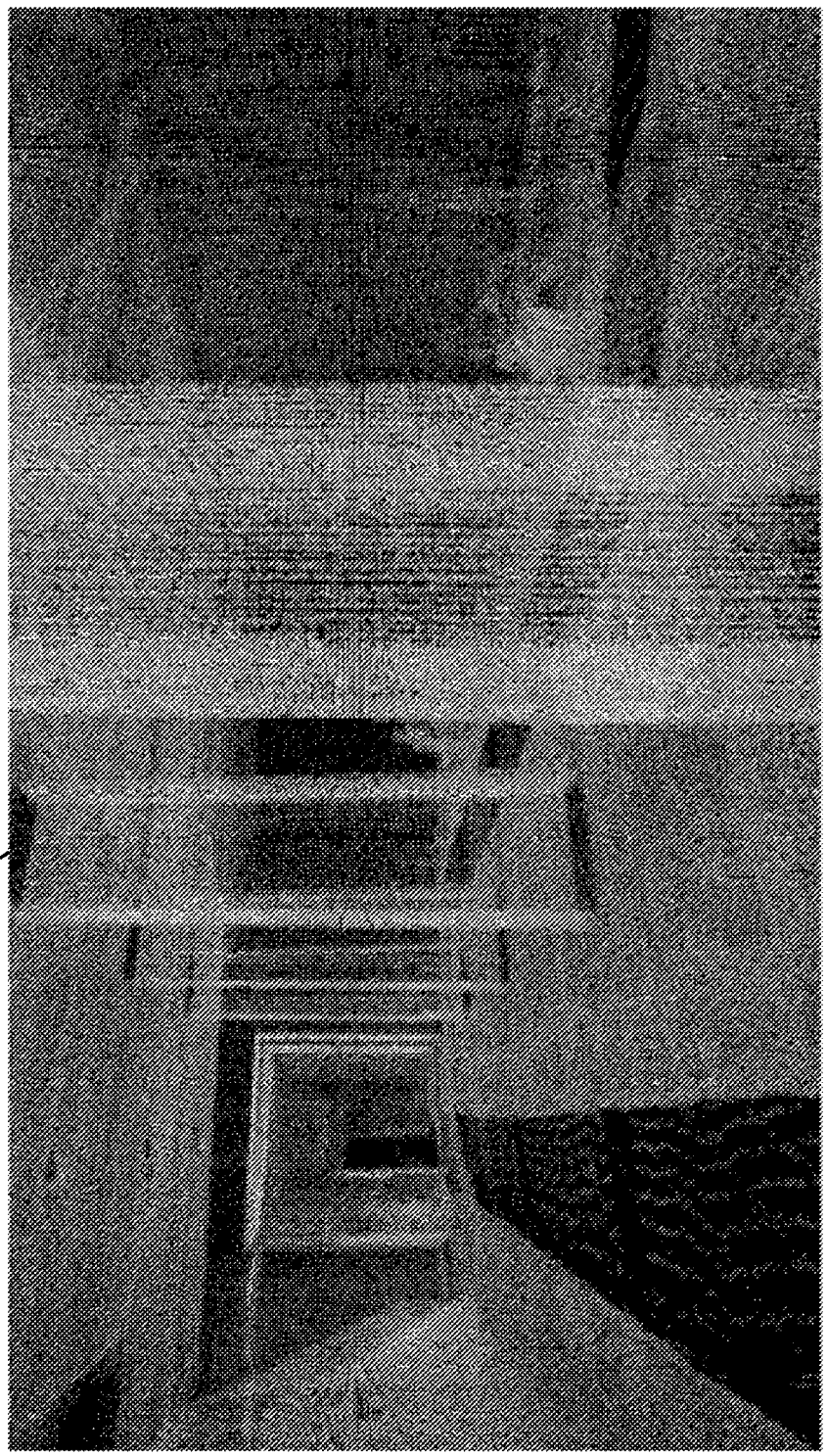
FIG. 5A shows a point cloud viewed from a virtual viewpoint used to lookup visible planes in a pre-computed point-to-plane map according to one embodiment.
Figure 5B:
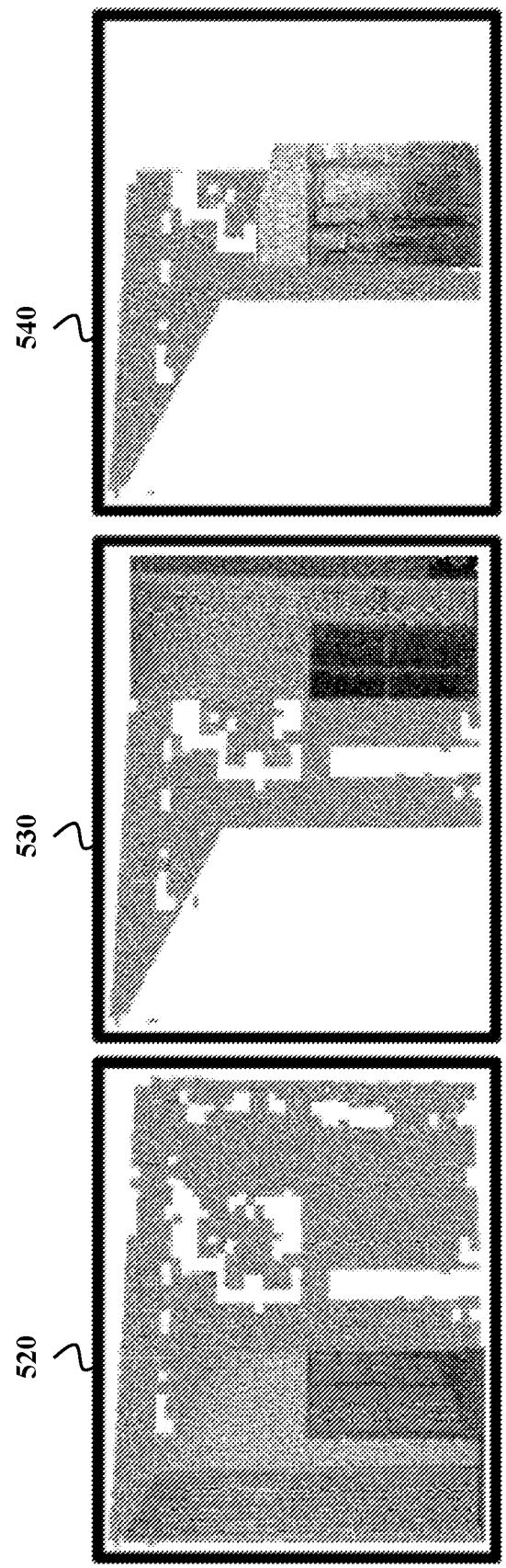
FIG. 5B shows examples of the warped images of a scene used to generated virtual images by some embodiments.

FIG. 5A shows a point cloud viewed from a virtual viewpoint used to lookup visible planes in a pre-computed point-to-plane map according to one embodiment. The major planes visible in the virtual view 510 are determined by casting rays from the center of the virtual camera through pixels in its image plane into the scene. When a ray hits a scene point, the map M is used to lookup the plane's position in space (the plane parameters). This step is performed for all pixels of the virtual view (although spatial sub-sampling in the pixel domain can be used for efficiency), and the resulting list of planes is sorted by the number of pixels that belong to each plane. For each plane, the embodiment keeps track of the pixels that are part of the plane. FIG. 5B shows examples of the warped images 520, 530, and 540 of a scene used to generated virtual images by one embodiment. In another embodiment, a frame is a regular 2D image and the virtual viewpoint has a same viewing position as a real frame while differs only in terms of orientation. In this embodiment, the virtual frame can be generated by warping every pixel $p_v$ in the new frame from the pixel $p_r$ in that real frame by $p_v = H p_r$, where $p_v$ and $p_r$ are 2D homogeneous coordinates of the pixels, H is a 3×3 homography matrix defined by $H = K_v R K_r^{-1}$, R is a 3D rotation matrix corresponding to the orientation of the virtual viewpoint with respect to the real viewpoint, and $K_v$ and $K_r$ are the 3×3 virtual and real camera intrinsic matrix respectively.

In yet another embodiment, when the virtual viewpoint has a different position with all real frames, the virtual images are generated using plane-induced homography. For this case, it is difficult to generate the virtual frame from a faraway virtual viewpoint for every pixel in the frame, since we often lack per-pixel 3D information. Instead of generating a dense virtual image like the previous two cases, we can generate a sparse virtual image focusing on pixel locations with previously estimated 3D information, i.e., all feature points in this real frame. This generation process can be done through image-based warping using plane-induced homography, explained as follows. Assuming a feature point's corresponding landmark is locally a small plane $(n_w, d_w)$, where $n_w$ is the plane's 3D normal direction in a world coordinate system, and $d_w$ is the world origin's distance to the plane. If this feature point was previously observed in a real frame whose pose in the world is $T_r \triangleq (R_r, t_r; 0, 1)$, where $R_r$ and $t_r$ are the real camera's 3D rotation matrix and translation vector respectively, and the given virtual viewpoint's pose is $T_v \triangleq (R_v, t_v; 0, 1)$, where $R_v$ and $t_v$ are the virtual camera's 3D rotation matrix and translation vector respectively, then from the multiple view geometry theory, a homography matrix between the real frame and the virtual frame induced by observing the same local plane can be found as $$H \triangleq K_v(R - tn^T d^{-1})K_r^{-1}, \qquad a$$

where $(R, t; 0, 1) = T_v^{-1} T_r$, $n = R_r^T n_w d = n_w^T t_r + d_w$, and $K_v$ and $K_r$ are the 3×3 virtual and real camera intrinsic matrix respectively.

This homography matrix can be used to warp this feature point and its neighboring pixels as a patch on the real frame to a patch on the virtual frame. This warped patch represents what is expected to be observed if a real camera observes the corresponding landmark from the virtual pose $T_v$. By repeating this warping operation for each feature point on the real frame, a virtual frame with sparse features is generated. In one embodiment, because the 3D information used in this case are estimations that can contain relatively large variance, especially during the beginning phase of a visual SLAM process, the virtual image generation is performed recursively with subsequence pose estimation and SLAM map optimization so that better virtual views are generated as the SLAM map quality increases.

The embodiments described herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each landmark or set of landmarks.

Figure 6:
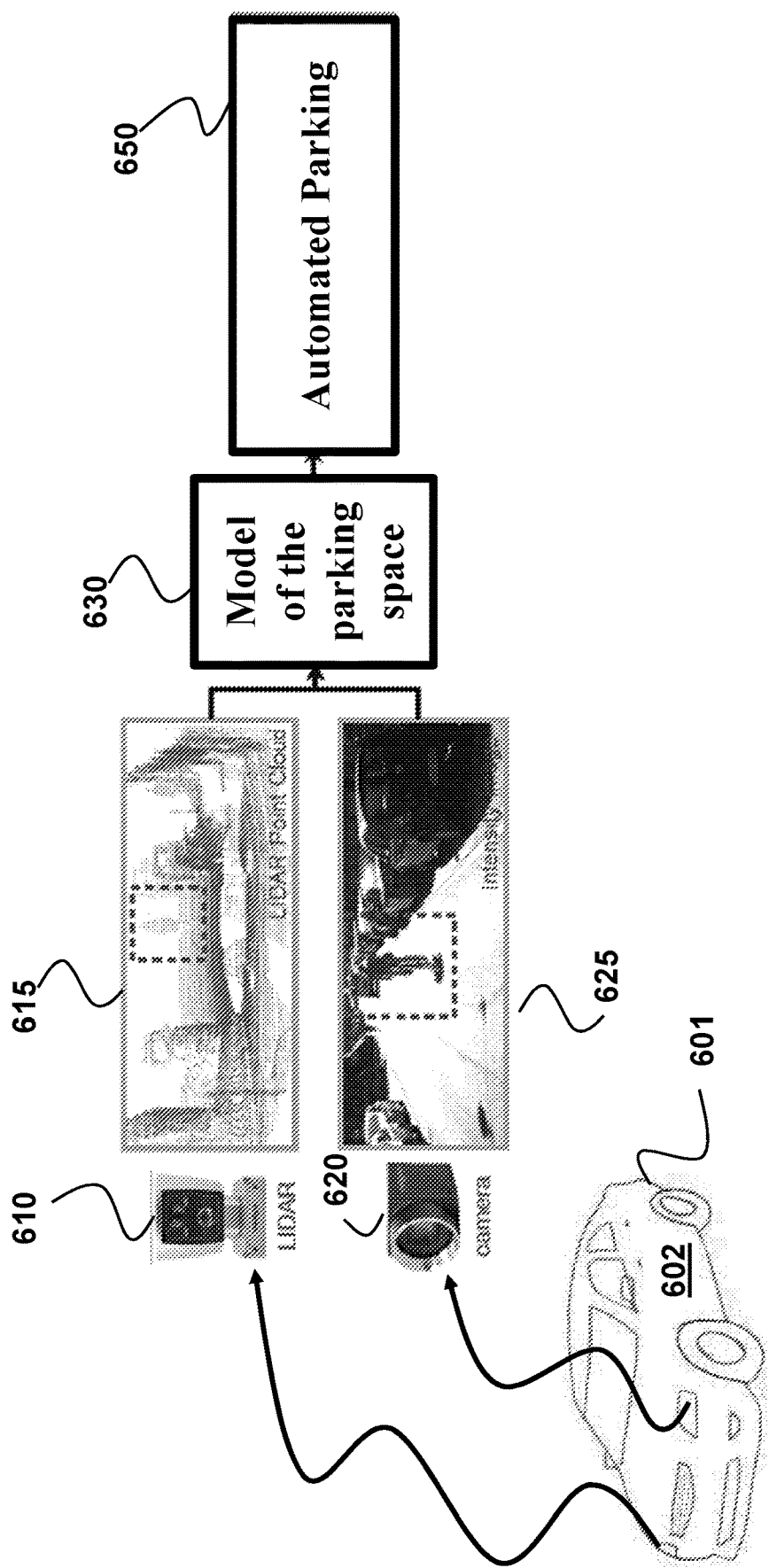
FIG. 6 shows a schematic of a system according to one embodiment.

FIG. 6 shows a schematic of a system according to one embodiment. The system includes a vehicle 601 including a processor 602 configured for performing an automated parking 650. The vehicle also includes at least one sensor, such as a LIDAR 610 and/or a camera 620. The sensor is operatively connected to the processor 602 and is configured for sensing information indicative of the geometry of at least part of the parking space. Using this information, the processor 602 determines and/or updates the model of the parking space 630 using VA-VSLAM. Further, the processor 602 performs the automated parking 650 using the map 130.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for reconstructing a three-dimensional (3D) model of a scene from a set of acquired images of the scene acquired by one or multiple sensors in different poses defining viewpoints of the acquired images, the set of acquired images includes a first acquired image acquired from a first viewpoint and a second acquired image acquired from a second viewpoint, wherein the 3D model includes a point cloud having points identified by 3D coordinates, wherein steps of the method are performed by a processor connected to a memory storing the set of images and coupled with stored instructions implementing the method, wherein the instructions, when executed by the processor carry out at least some steps of the method comprising:

transforming at least some acquired images from the set of acquired images to produce a set of virtual images of the scene viewed from virtual viewpoints different from the viewpoints of the acquired images, wherein the transforming transforms the first acquired image into a first virtual image corresponding to a first virtual viewpoint different from the viewpoint of each of the acquired images, and wherein the transforming preserves correspondence between at least a subset of pixels of the first acquired image and a subset of pixels of the first virtual image that represent the same points of the scene;

comparing at least some features from the acquired images and the virtual images to determine the viewpoint of at least one image in the set of images, wherein the comparing includes comparing features of pixels of the second acquired image with features of the subset of pixels of the first virtual image to determine a correspondence among a subset of pixels of the second acquired image and the subset of pixels of the first virtual image;

registering the second viewpoint of the second acquired image with respect to the first viewpoint of the first acquired image by tracking the correspondence of the subset of pixels of the second acquired image to the subset of pixels of the first acquired image through common correspondence to the subset of pixels of the first virtual image; and updating 3D coordinates of at least one point in the model of the scene to match coordinates of intersections of ray back-projections from pixels of at least two images corresponding to the point according to the viewpoints of the two images.

2. The method of claim 1, further comprising:
updating 3D coordinates of the points in the model of the scene using a bundle adjustment of corresponding pixels in the first and the second acquired images.

3. The method of claim 2, wherein the first image is acquired by a 3D sensor, further comprising:
determining the coordinates of points of the scene corresponding to the subset of pixels from the first image using the 3D sensor.

4. The method of claim 2, further comprising:
determining the coordinates of points of the scene corresponding to the subset of pixels from the first image using a pre-defined initial distance.

5. The method of claim 2, wherein the virtual viewpoint has a same position but a different orientation than the first viewpoint, further comprising:
generating the first virtual image by warping every pixel in the first image using a homography matrix determined from a difference in orientation between the virtual viewpoint and the first viewpoint and a camera intrinsic matrix.

6. The method of claim 2, wherein the set of images includes a third image of the scene acquired in a third pose defining a third viewpoint, further comprising:
comparing features of the first and the third images to determine pixels of the first and the third images corresponding to the same points in the scene; and
determining the coordinates of points of the scene corresponding to the subset of pixels from the first image using a relative pose estimation.

7. The method of claim 1, further comprising:
sampling a six degrees-of-freedom (6-DOF) sensor pose space to produce a set of sampled viewpoints; and
generating the virtual images for the set of sampled viewpoints.

8. The method of claim 7, wherein the sampling is biased toward images in the set of images having unknown viewpoints.

9. The method of claim 7, further comprising:
estimating the subspace of the 6-DOF sensor pose space for a future viewpoint of an image;
sampling the subspace of the 6-DOF sensor pose space to produce a sampled viewpoint; and
generating the virtual image for the sampled viewpoint.

10. The method of claim 9, further comprising:
estimating the subspace of the 6-DOF camera pose space using a current pose of the sensor and a trajectory of a motion of the sensor.

11. The method of claim 9, wherein the virtual images are produced using one or combination of warping at least one image from the set of images, projecting the model of the scene into the virtual viewpoint, and using plane-induced homography.

12. A system for reconstructing a three-dimensional (3D) model of a scene including a point cloud having points identified by 3D coordinates, comprising:
at least one sensor to acquire a set of acquired images of the scene from different poses defining viewpoints of the acquired images, the set of acquired images includes a first acquired image corresponding to a first viewpoint and a second acquired image corresponding to a second viewpoint;
a memory to store the set of acquired images and the 3D model of the scene; and
a processor operatively connected to the memory and coupled with stored instructions to
transform at least some acquired images from the set of acquired images to produce a set of virtual images of the scene viewed from virtual viewpoints different from the viewpoints of the acquired images, such that the first acquired image is transformed into a first virtual image corresponding to a first virtual viewpoint different from the viewpoint of each of the acquired images, where correspondence between at least a subset of pixels of the first acquired image and a subset of pixels of the first virtual image that represent the same points of the scene is preserved;
compare at least some features from the acquired images and the virtual images to determine the viewpoint of at least one image in the set of images, wherein features of pixels of the second acquired image are compared with features of the subset of pixels of the first virtual image to determine a correspondence among a subset of pixels of the second acquired image and the subset of pixels of the first virtual image;
register the second viewpoint of the second acquired image with respect to the first viewpoint of the first acquired image by tracking the correspondence of the subset of pixels of the second acquired image to the subset of pixels of the first acquired image through the subset of pixels of the first virtual image; and
update 3D coordinates of at least one point in the model of the scene to match coordinates of intersections of ray back-projections from pixels of at least two images corresponding to the point according to the viewpoints of the two images.

13. The system of claim 12, wherein the set of images includes a first image of the scene acquired in a first pose defining a first viewpoint and includes a second image of the scene acquired in a second pose defining a second viewpoint, wherein the processor is further configured to
transform the first image to generate a first virtual image corresponding to a virtual viewpoint different from the first viewpoint, wherein the transforming preserves correspondence between at least some pixels of the first image and the virtual image to represent the same points of the scene;
compare at least some features of the second image with at least some feature of the virtual image to determine a correspondence among at least some pixels of the second image, the virtual image, and the first image;
determine the second viewpoint of the second image with respect to the first viewpoint of the first image using a subset of the correspondent pixels from the first and the second images based on coordinates of the subset of pixels from the second image and coordinates of points of the scene corresponding to the subset of pixels from the first image; and
update 3D coordinates of the points in the model of the scene using a bundle adjustment of corresponding pixels in the first and the second images.

14. The system of claim 13, wherein the first image is acquired by a 3D sensor and the processor determines the coordinates of points of the scene corresponding to the subset of pixels from the first image using the 3D sensor.

15. The system of claim 13, wherein the set of images includes a third image of the scene acquired in a third pose defining a third viewpoint, wherein the processor
compares features of the first and the third images to determine pixels of the first and the third images corresponding to the same points in the scene; and determines the coordinates of points of the scene corresponding to the subset of pixels from the first image using a relative pose estimation.

16. The system of claim 13, wherein the virtual images are produced using one or combination of warping at least one image from the set of images, projecting the model of the scene into the virtual viewpoint, and using plane-induced homography.

17. A non-transitory computer readable storage medium embodied thereon a program executable by a processor for performing a method for reconstructing a three-dimensional (3D) model of a scene from a set of acquired images of the scene acquired by at least one sensor in different poses defining viewpoints of the acquired images, the set of acquired images includes a first acquired image corresponding to a first viewpoint and a second acquired image corresponding to a second viewpoint, wherein the 3D model includes a point cloud having points identified by 3D coordinates, the method comprising:

transforming at least some acquired images from the set of acquired images to produce a set of virtual images of the scene viewed from virtual viewpoints different from the viewpoints of the acquired images, wherein the transforming transforms the first acquired image into a first virtual image corresponding to a first virtual viewpoint different from the viewpoint of each of the acquired images, and wherein the transforming preserves correspondence between at least a subset of pixels of the first acquired image and a subset of pixels of the first virtual image that represent the same points of the scene;

comparing at least some features from the acquired images and the virtual images to determine the viewpoint of at least one image in the set of images, wherein the comparing includes comparing features of pixels of the second acquired image with features of the subset of pixels of the first virtual image to determine a correspondence among a subset of pixels of the second acquired image and the subset of pixels of the first virtual image;

registering the second viewpoint of the second acquired image with respect to the first viewpoint of the first acquired image by tracking the correspondence of the subset of pixels of the second acquired image to the subset of pixels of the first acquired image through the subset of pixels of the first virtual image; and updating 3D coordinates of at least one point in the model of the scene to match coordinates of intersections of ray back-projections from pixels of at least two images corresponding to the point according to the viewpoints of the two images.

* * * * *